US005578174A

United States Patent [19]
Sekhar

[11] Patent Number: 5,578,174
[45] Date of Patent: Nov. 26, 1996

[54] CONDITIONING OF CELL COMPONENTS FOR ALUMINUM PRODUCTION

[75] Inventor: Jainagesh A. Sekhar, Cincinnati, Ohio

[73] Assignee: Moltech Invent S.A., Luxembourg, Luxembourg

[21] Appl. No.: 232,052

[22] PCT Filed: Apr. 15, 1994

[86] PCT No.: PCT/IB94/00071

§ 371 Date: Apr. 28, 1994

§ 102(e) Date: Apr. 28, 1994

[87] PCT Pub. No.: WO94/24069

PCT Pub. Date: Oct. 27, 1994

[51] Int. Cl.$^6$ ............................................ C25C 3/08
[52] U.S. Cl. ................ 204/243 R; 204/291; 204/290 R; 204/279; 427/113; 427/126.3; 427/126.4; 427/294; 427/314; 427/372.2; 205/384; 205/385
[58] Field of Search ................. 204/67, 243 R, 204/279, 280, 290 R, 291, 294; 427/113, 126.3, 126.4, 294, 314, 372.2; C25C 3/06, 3/08

[56] References Cited

U.S. PATENT DOCUMENTS

| | | | |
|---|---|---|---|
| 4,244,986 | 1/1981 | Paruso et al. | 427/126.4 |
| 4,466,996 | 12/1984 | Boxall et al. | 427/122 |
| 4,595,545 | 6/1986 | Sane | 264/65 |
| 4,612,103 | 9/1986 | Dewing et al. | 204/243 R |
| 4,613,418 | 9/1986 | Dewing et al. | 204/243 R |
| 4,737,253 | 4/1988 | Gesing et al. | 204/243 R |
| 4,737,254 | 4/1988 | Gesing et al. | 204/243 R |
| 5,071,533 | 12/1991 | de Nora et al. | 204/243 R |
| 5,135,621 | 8/1992 | de Nora et al. | 204/67 |
| 5,310,476 | 5/1994 | Sekhar et al. | 205/230 |
| 5,320,717 | 6/1994 | Sekhar | 204/67 |
| 5,364,513 | 11/1994 | Sekhar et al. | 204/243 R |
| 5,378,327 | 1/1995 | Sekhar et al. | 204/67 |
| 5,413,689 | 5/1995 | de Nora et al. | 204/279 |

FOREIGN PATENT DOCUMENTS

| | | |
|---|---|---|
| 0115745 | 8/1984 | European Pat. Off. . |
| 0145412 | 11/1984 | European Pat. Off. . |
| 93020026 | 10/1993 | WIPO . |
| 93025731 | 12/1993 | WIPO . |

OTHER PUBLICATIONS

Laboratory Testing of the Expansion Under Pressure Due to Sodium Intercalation in Carbon Cathode Materials for Aluminium Smelters, Jm. Peyneau, Jr., et al., Light Metals 1992, pp. 801–808 no month available.

Sodium, Its Influence on Cathode Life in Theory and Practice, Jörg Mittag, et al., Light Metals 1992, pp. 789–793 no month available.

Sodium and Bath Penetration into TIB$_2$–Carbon Cathodes during Laboratory Aluminium Electrolysis, Jilai Xue, et al., Light Metals 1992, pp. 773–778 no month available.

Change of the Physical Properties and the Structure in Carbon Materials Under Electrolysis Test, C. Ozaki, et al., Light Metals 1992, pp. 759–764 no month available.

Primary Examiner—Kathryn Gorgos
Attorney, Agent, or Firm—Dinsmore & Shohl

[57] ABSTRACT

Components of electrolytic cells for the production of aluminum in particular by the electrolysis of alumina in a molten fluoride electrolyte, made of carbon or other microporous material which remains stable or may be consumed in the cell operating conditions, are conditioned to better resist in the cell operating conditions by impregnating them with colloidal ceria, cerium acetate, silica, alumina, lithia, yttria, thoria, zirconia, magnesia or monoaluminum phosphate containing ionic species of sodium, lithium, potassium, aluminum, calcium or ammonium, followed by drying and heat treatment.

52 Claims, No Drawings

CONDITIONING OF CELL COMPONENTS FOR ALUMINUM PRODUCTION

This application is a 371 of PCT/IB94/00071 filed Apr. 15, 1994.

FIELD OF THE INVENTION

This invention relates to a method of conditioning components of electrolytic cells for the production of aluminium in particular by the electrolysis of alumina in a molten fluoride electrolyte.

BACKGROUND ART

Aluminium is produced conventionally by the Hall-Héroult process, by the electrolysis of alumina dissolved in cryolite-based molten electrolytes at temperatures up to around 950° C. A Hall-Héroult reduction cell typically has a steel shell provided with an insulating lining of refractory material, which in turn has a lining of carbon which contacts the molten constituents. Conductor bars connected to the negative pole of a direct current source are embedded in the carbon cathode substrate forming the cell bottom floor. The cathode substrate is usually an anthracite based carbon lining made of prebaked cathode blocks, joined with a ramming mixture of anthracite, coke, and coal tar.

In Hall-Héroult cells, a molten aluminium pool acts as the cathode. The carbon lining or cathode material has a useful life of three to eight years, or even less under adverse conditions. The deterioration of the cathode bottom is due to erosion and penetration of electrolyte and liquid aluminium as well as intercalation of sodium, which causes swelling and deformation of the cathode carbon blocks and ramming mix. In addition, the penetration of sodium species and other ingredients of cryolite or air leads to the formation of toxic compounds including cyanides.

The anodes are usually prebaked carbon blocks that are consumed by the electrochemical reaction, corroded by contact with the electrolyte and eroded by the evolved oxidizing gases. Attempts to replace these consumable carbon anodes by non-consumable oxygen evolving anodes have encountered difficulties linked to the inherent porosity of the ceramic and metal ceramic materials proposed for this purpose, and because of the imperfect impermeability of protective coatings, e.g. based on cerium oxyfluoride, whereby unwanted species penetrate into the bulk of the anode material and cause damage.

The problems associated with penetration of sodium into the carbon cathode have been extensively studied and discussed in the literature.

Several papers in Light Metals 1992 published by the The Minerals, Metals and Materials Society discuss these problems. A paper "Sodium, Its Influence on Cathode Life in Theory and Practice" by Mirtag et al, page 789, emphasises the advantages of using graphitic carbon over anthracite. Reasons for the superiority of graphitic carbon were also set out in a paper "Change of the Physical Properties and The Structure in Carbon Materials under Electrolysis Test" by Ozaki et al, page 759. Another paper "Sodium and Bath Penetration into $TiB_2$ Carbon Cathodes During Laboratory Aluminium Electrolysis" by Xue et al, page 773, presented results showing that the velocity of sodium penetration increased with increasing $TiB_2$ content. Another paper "Laboratory Testing of the Expansion Under Pressure due to Sodium Intercalation in Carbon Cathode Materials for Aluminium Smelters" by Peyneau et al, page 801, also discusses these problems and describes methods of measuring the carbon expansion due to intercalation.

There have been several attempts to avoid or reduce the problems associated with the intercalation of sodium in carbon cathodes in aluminum production.

Some proposals have been made to dispense with carbon and instead use a cell bottom made entirely of alumina or a similar refractory material, with a cathode current supply arrangement employing composite current feeders using metals and refractory hard materials. See for example, EP-B-0 145 412, EP-A-0 215 555, EP-B-0 145 411, and EP-A-0 215 590. So far, commercialization of these promising designs has been hindered due to the high cost of the refractory hard materials and difficulties in producing large pieces of such materials.

Other proposals have been made to re-design the cell bottom making use of alumina or similar refractory material in such a way as to minimize the amount of carbon used for the cathode—see U.S. Pat. Nos. 5,071,533 and 5,135,621. Using these designs will reduce the problems associated with carbon, but the carbon is still subject to attack by sodium during cell start up.

There have been numerous proposals to improve the carbon materials by combining them with $TiB_2$ or other refractory hard materials, see e.g. U.S. Pat. No. 4,466,996. But, as pointed out in the above-mentioned paper of Xue et al, with such composite materials, the penetration increases with increasing $TiB_2$ content.

WO/93/20027 proposes applying a protective coating of refractory material to a carbon cathode by applying a micropyretic reaction layer from a slurry containing particulate reactants in a colloidal carrier, and initiating a micropyretic reaction. To assist rapid wetting of the cathode by molten aluminium, it was proposed to expose the coated cathode to a flux of molten aluminium containing a fluoride, a chloride or a borate of lithium and/or sodium. This improves the wetting of the cathode by molten aluminium, but does not address the problem of sodium attack on the carbon, which is liable to be increased due to the presence of $TiB_2$.

No adequate solution has yet been proposed to substantially reduce or eliminate the problems associated with sodium penetration in carbon cathodes, namely swelling especially during cell start-up, displacement of the carbon blocks leading to inefficiency, reduced lifetime of the cell, the production of large quantities of toxic products that must be disposed of when the cell has to be overhauled, and the impossibility to use low density carbon. Corresponding problems of penetration of unwanted species into anodes also remain unsolved.

SUMMARY OF THE INVENTION

The invention provides a method of conditioning components of electrolytic cells for the production of aluminium in particular by the electrolysis of alumina in a molten fluoride electrolyte, in order to improve the resistance of the components to corrosion in the aggressive environment in the cells. The invention applies to cell components made of a microporous material which remains stable or may be consumed in the cell operating conditions; this microporous material having an open porosity which extends to the surfaces of the component which, in use, are exposed to the conditions in the cell.

The method according to the invention comprises impregnating the component with a colloid of at least one of ceria, cerium acetate, silica, alumina, lithia, yttria, thoria, zirconia, magnesia and monoaluminium phosphate in a stabilizing solution containing ionic species of at least one of sodium, lithium, potassium aluminium, calcium and ammonium, and drying the colloid-impregnated component. The stabilizing solution may preferably also contain chloride ions.

Impregnation of the component is preferably followed by a heat treatment and may also be preceded by a heat treatment, for example at about 1000° C. Sometimes, a single impregnation suffices, but usually the impregnation and drying steps are repeated until the component is saturated with the colloid. The number of impregnations needed to saturate the material can be determined by measuring the weight gain.

The component is conventionally impregnated by dipping it into the colloid, which can take place in ambient conditions, but the impregnation may be assisted by the application of a pressure differential, by applying pressure or a vacuum.

Advantageously, and especially when the electrolyte in the aluminium production cell contains cerium, for instance cryolite containing cerium which maintains a protective cerium oxyfluoride coating on the anode, the component is impregnated with a cerium-based colloid, typically comprising at least one of colloidal ceria and colloidal cerium acetate with the given ionic stabilizers. This cerium-based colloidal carrier may further comprise colloidal alumina, yttria, silica, thoria, zirconia, magnesia, lithia and/or monoaluminium phosphate.

The colloid may be derived from colloid precursors and reagents which are solutions of at least one salt such as chlorides, sulfates, nitrates, chlorates, perchlorates or metal organic compounds such as alkoxides, formates, acetates and mixtures thereof. The aforementioned solutions of metal organic compounds, principally metal alkoxides, may be of the general formula $M(OR)_z$ where M is a metal or complex cation, R is an alkyl chain and z is a number usually from 1 to 12.

The colloid usually has a dry colloid content corresponding to up to 50 weight % of the colloid plus liquid carrier, preferably from 10 to 20 weight %. The liquid carrier is usually water but could be non-aqueous. The sodium or other ions in the colloid stabilize the dried colloid and Greatly improve the resistance of the composite material making up the component to penetration by unwanted ions, such as by sodium ions in cathodic applications.

The microporous material making up the component has an open porosity usually from 5% to 40%, often from about 15% to about 30%. Such microporous materials are in particular liable to be attacked by the corrosive cell contents at the high operating temperatures. Impregnation of the pores with a selected colloid greatly increases the materials' resistance to corrosion particularly due to the stabilizing effect of the sodium or other ions.

For anode applications, it is advantageous for the carbon or other microporous material making up to the anode to be impregnated with alumina with the colloid-stabilizing ions, or with colloidal monoaluminium phosphate which will be oxidized to alumina again with a stabilizer. As the anode is consumed in use, the alumina it contains provides a source of the material to be electrolyzed at locations where it is most important. In particular, when the alumina in the electrolyte is depleted due to insufficient replenishment from an external supply, the alumina from the anode will serve to prevent anode effects by maintaining a sufficient alumina concentration in the electrolysis space.

For some applications, the component has a protective coating; the impregnation of the component usually being followed by the application of the coating. For instance, when the component is an anode, the protective coating advantageously comprises at least one rare earth oxycompound including cerium oxyfluoride. Such an anode is impregnated with a cerium-based stabilized colloid before application of the cerium oxyfluoride coating which may take place in-situ in the aluminium production cell. When the anode is initially immersed in a cerium-containing fluoride-based electrolyte, the colloid-originating cerium in the anode promotes initial cerium oxyfluoride formation and improves the impermeability of the cerium oxyfluoride coating by dissolution and re-deposition, which provides a self-healing effect. These effects are enhanced when the microporous material of the anode is a composite material based on aluminides of at least one of nickel, iron and titanium and further containing copper oxide.

For components Such as carbon blocks or masses subject to oxidizing or corrosive environments, for example prebaked carbon anodes, the coating may be a protective coating which improves the resistance of the component to oxidation, and which may also enhance the component's electrical conductivity and/or its electrochemical activity; such coating advantageously being applied from a colloidal slurry containing reactant or non-reactant substances, or a mixture of reactant and non-reactant substances, which when the component is heated to a sufficient elevated temperature react and/or sinter to form the protective coating. Such coatings, which in preferred compositions comprise carbides, silicides, borides, nitrides, oxides, nitrides, carbonitrides, oxynitrides and combinations of these, in particular SiC and $MoSi_2$, possibly together with metallic particles such as for example Ni, Pt, Al, Cr or intermetallic particles such as for example NiAl, $NiAl_3$, CrSi, CrB etc. or combinations thereof, as well as the reaction products of micropyretic agents which are particles, fibers or foils of materials such as Ni, Al, Ti, B, Si, Nb, C, $Cr_2O_3$, Zr, Ta, $TiO_2$, $B_2O_3$, Fe or combinations, are described in U.S. Pat. No. 5,364,513 the contents of which are incorporated herein by way of reference.

When the impregnated component is a cathode, a surface coating comprising a Refractory Hard Metal boride can be applied, advantageously by the method described in U.S. Pat. No. 5,310,476 the contents whereof are incorporated herein by way of reference.

The colloid-impregnated component may also be a cell bottom or lining. Stabilized colloid cerium impregnated in the microporous material in particular improves its performance when used as cathode or cell lining in an aluminium production cell with a cerium-containing fluoride-based electrolyte.

For cathodes and cell linings subject to penetration by sodium from the molten content of the cell, one advantageous impregnating agent is a colloid in a solution containing at least one compound of lithium, sodium and potassium, preferably a lithium compound. Impregnation of carbon cathodes with a colloid in a solution of a lithium, sodium or potassium salt, followed by heat treatment greatly improves the cathode's resistance to sodium impregnation, as taught in U.S. Pat. No. 5,378,327 (MOL0515), the contents whereof are incorporated herein by way of reference.

The invention also concerns a component of a molten salt electrolysis cell, in particular a cell for the production of aluminium by the electrolysis of alumina in a molten fluoride electrolyte, made of a microporous material which remains stable or may be consumed in the cell operating conditions and which has open porosity extending to its surface which, in use, is exposed to the conditions in the cell. According to the invention, such component is impregnated with dried colloidal ceria, cerium acetate, silica, alumina, lithia, yttria, thoria, zirconia, magnesia or monoaluminium phosphate stabilized by ionic species of at least one of sodium, lithium, potassium aluminium, calcium and ammonium, and may incorporate the other features of the invention set out above.

Such components may for example be a prebaked carbon anode which is impregnated with stabilized colloidal alumina; or a stabilized colloid-impregnated anode or other component made of microporous material comprising an ordered aluminide of at least one of nickel, copper and titanium; or a stabilized colloid-impregnated cell bottom or lining, e.g. a carbon cathode impregnated with a stabilized colloid.

Carbon components may, for instance, be made of petroleum coke, metallurgical coke, anthracite, graphite, amorphous carbon, fullerene such as fullerene $C_{60}$ or $C_{70}$ or of a related family, low density carbon or mixtures thereof.

It is advantageous for bodies of low density carbon to be impregnated with a stabilized colloid according to the invention, for example if the component is exposed to oxidizing gas released in operation of an electrolytic cell, or also when the substrate is part of a cell bottom. Low density carbon embraces various types of relatively inexpensive forms of carbon which are relatively porous and very conductive, but hitherto could not be used successfully in the environment of aluminium production cells on account of the fact that they were subject to excessive corrosion or oxidation. Now, it is possible, by impregnating these low density carbons with a colloid according to the invention, to make use of them in these cells instead of the more expensive nigh density anthracite and graphite, taking advantage of their excellent conductivity and low cost.

The microporous material making up the component may also be a carbon-based composite material comprising carbon and at least one further component selected from refractory oxycompounds, in particular alumina, and refractory hard metal borides, carbides and silicides, in particular titanium diboride. Examples of such materials are described in U.S. Pat. No. 5,413,689 the contents whereof are incorporated herein by way of reference.

The microporous material may also be a composite material of a refractory hard metal boride and a refractory oxide, such as titanium diboride/alumina, such materials being suitable for use as cell bottoms or as tiles or other pieces secured on cell bottoms.

A further aspect of the invention is an electrolytic cell for the production of aluminium, in particular by the electrolysis of alumina in a molten fluoride electrolyte, comprising a component made of a microporous material which remains stable or may be consumed in the cell operating conditions and which has open porosity extending to its surface exposed to the conditions in the cell, wherein the component is impregnated with a dried colloid of ceria, cerium acetate, silica, alumina, lithia, yttria, thoria, zirconia, magnesia or monoaluminium phosphate stabilized by ionic species of at least one of sodium, lithium, potassium aluminium, calcium and ammonium, as set out above.

A specific object of the present invention is to improve the resistance of carbon cathodes of aluminium production cells or, more generally, of carbon-containing cathodic components of such cells, to the penetration therein of molten electrolyte components and in particular to intercalation by sodium, thereby improving the resistance of the components to degradation during use.

The invention applies to cathodes or other cathodic cell components made of carbon or other carbon-based microporous materials which have an open porosity which extends to the surfaces of the component which, in use, are exposed to the conditions in the cell.

The term carbon cathode is meant to include both preformed carbon blocks ready to be assembled into a cathode in the bottom of an aluminium production cell, as well as installed cathodes forming the cell bottom and the carbon side walls extending up from the bottom and which are also cathodically polarized and, therefore, subject to attack by sodium from the molten cell content. Other carbon cathodic components include weirs and baffles secured on the cell bottom.

The invention provides a method of treating carbon-based components of electrolytic cells for the production of aluminium in particular by the electrolysis of alumina in a sodium-containing molten halide electrolyte such as cryolite, in order to improve their resistance to attack in the aggressive environment in the cells, in particular their resistance to intercalation by sodium.

The method according to the invention comprises impregnating and/or coating the cell component with a colloid of alumina, ceria, cerium acetate, silica, lithia, yttria, thoria, zirconia, magnesia or monoaluminium phosphate stabilized by ionic species of at least one of sodium, lithium, potassium aluminium, calcium and ammonium, and drying the colloid-impregnated component. Stabilized colloidal alumina is preferred, and mixtures of colloidal alumina with the other colloids can also be used.

The method also includes optionally coating the surface of the component, or including in the surface of the component, a refractory material, such as aluminium-wettable titanium diboride. In this case, the material of the component under the aluminium-wettable refractory material must be impregnated with the stabilized colloid, in order to provide an effective barrier to penetration of sodium or other species of the cell environment.

Thus, when the component is coated with stabilized colloid, the stabilized colloid coating may optionally contain refractory components such as titanium diboride provided the component is impregnated with colloid in order to provide a barrier to penetration by sodium or other species. But the stabilized colloid coating may be devoid of refractory components particularly in the case where the component is coated with, for example, "thick" stabilized colloidal alumina; in which case, the coating already provides a barrier to sodium penetration at the surface and the stabilized colloid need not penetrate so deeply into the carbon or carbon-based material.

Such impregnation and/or coating the carbon or carbon-based component, in particular with stabilized colloidal alumina, has been found to improve the resistance of the carbon to damage by sodium impregnation due to the fact that the colloids are stabilized by sodium or other monovalent ions. The sodium or other ions present enhance stabilization, which occurs during use of the component in the cathodic environment of the aluminium production cell, making the diffusion of fresh sodium difficult. Such stabilization is particularly effective when the sodium attack occurs through micropores in the carbon or carbon-based material. Therefore, to optimize the protective effect, it is preferred to impregnate the microporous carbon or carbon-based material with the stabilized colloid.

In addition, the colloid impregnation and/or coating with colloids stabilized with sodium or other ions prevents or inhibits cryolite penetration due to the fact that sodium impregnation in the surface generally makes the carbon or carbon-based material more wettable by cryolite. By limiting sodium penetration to the colloid surface, this enhances wettability of the surface by cryolite, which assists in keeping the cryolite at the surface. Hence, the enhanced resistance to sodium penetration unexpectedly is associated with an enhanced protection against damage by cryolite penetration.

This surprising synergistic effect leads to several further advantages. For example, as a consequence of the inhibition of sodium and cryolite penetration into the bulk of the carbon or carbon-based material, the formation of toxic components is greatly reduced.

Furthermore, the colloid stabilized with sodium or other ions and impregnated in the carbon or carbon-containing surface, or coated on the surface, improves the resistance of the carbon or carbon-based material to abrasion by sludge that deposits on the cathode surface and may move with the cathodic pool of aluminium and thereby wear the surface.

Also, by protecting the carbonaceous cell components from attack by NaF or other aggressive ingredients of the electrolyte, the cell efficiency is improved. Because NaF in the electrolyte no longer reacts with the carbon cell bottom and walls, the cell functions with a defined bath ratio without a need to replenish the electrolyte with NaF.

Impregnation and/or coating of the component is preferably followed by a heat treatment and may also be enhanced by preceding it with a heat treatment, for example at about 1000° C., as described above.

When the impregnated carbon or carbon-based cathode or cathodic component is coated with a refractory coating forming a cathodic surface in contact with the cathodically-produced aluminium, it can be used as a drained cathode. The refractory coating forms the cathodic surface on which the aluminium is deposited cathodically usually with the component arranged upright or at a slope for the aluminium to drain from the cathodic surface.

A further aspect of the invention is an electrolytic cell for the production of aluminium, in particular by the electrolysis of alumina in a sodium-containing molten halide electrolyte such as cryolite, comprising a cathodic component made of carbon or a carbon-based material, wherein the component is impregnated and/or coated with colloidal alumina, ceria, cerium acetate, silica, lithia, yttria, thoria, zirconia, magnesia or monoaluminium phosphate, stabilized by ionic species of at least one of sodium, lithium, potassium aluminium, calcium and ammonium, as set out above.

The invention also concerns a method of producing aluminium by the electrolysis of alumina dissolved in molten cryolite in a cell having a colloid impregnated and/or coated carbon cathode as set out above; an electrolytic cell for producing aluminium by the electrolysis of alumina dissolved in molten cryolite provided with such a colloid impregnated and/or coated carbon; a method of conditioning carbon cathodes for use in such cells; as well as a method of reconditioning these electrolytic cells. The electrolyte may be cryolite or modified forms of cryolite in particular containing LiF, and may be at the usual operating temperature of about 950° C., or lower temperatures.

DETAILED DESCRIPTION

The invention will be further described in the following examples. Examples 1 and 2 describe the preparation microporous materials for use as anodes. Examples 3 to 12 describe colloidal impregnation of various samples and testing.

EXAMPLE 1

Preparation of Microporous Material

A powder mixture was prepared from nickel powder, −100 mesh, aluminium powder, −325 mesh, and copper powder, −200 mesh. First, the nickel and aluminium powders were mixed in a ratio Ni:Al 87:13 wt %, Then, this mixture was mixed with copper powder in a ratio Ni/Al:Cu 90:10 wt % in 12 ml of colloidal cerium acetate per 100 grams of the powder mixture.

After 10 minutes of mixing, which was sufficient to produce a good mixture, the mixture was compacted into samples by applying a pressure of about 170 MPa for 2–3 minutes, and allowed to dry in air for at least 3 hours. When the sample was almost dry, an exothermic reaction between the powders and cerium acetate occurred. To keep the samples cool and avoid cracking, cool air was blown on the samples by an air gun.

After the samples had dried completely, a small hole was drilled in the bottom of each sample to threadably receive a nickel-based superalloy rod to provide for electrical connection to the sample.

The samples were then combusted in a furnace at 900° C. to initiate a micropyretic reaction which swept through the sample, and afterwards allowed to cool slowly to avoid cracking. The resulting samples had an open porosity from about 5% to about 15%.

EXAMPLE 2

Preparation of Microporous Materials

Example 1 was repeated varying the proportion of Ni:Al, in the ratios 75:25; 86.6:13.4; 90:10; 92:8; 94:6 and 96:4. The weight ratio of Ni/Al:Cu was kept constant at 90:10. Colloidal cerium acetate was added to the different series of samples in amounts of 12 ml, 24 ml and 36 ml/100 grams of powder mixture. Compacting was carried out at approx. 170 MPa for 4 minutes. After drying, the samples were combusted in a furnace at 950° C. All samples underwent a micropyretic reaction. The resulting samples had an open porosity from about 5% to about 15%.

EXAMPLE 3

A sample prepared as in Example 1 was conditioned for use as an aluminium electrowinning anode by heating in air at 1000° C. for 4 hours to oxidize its surface. After cooling, the sample was dipped in colloidal cerium acetate in a liquid carrier comprising at least one compound of lithium, aluminium, cerium, calcium, sodium and/or potassium, preferably a soluble compound, or an ammonium compound, until no more is absorbed. The sample was then heated in an oven to dry it. After cooling, the sample was again dipped in stabilized colloidal cerium acetate and dried. The dipping and drying steps were repeated until no more cerium acetate was absorbed.

The stabilizing lithium compound may be lithium acetate, lithium carbonate, lithium fluoride, lithium chloride, lithium oxalate, lithium nitride, lithium nitrate, lithium formate and lithium aryl, lithium tetraborate and mixtures thereof. Like sodium compounds may be used, though sodium chloride is not preferred.

The stabilizing aluminium compound, if present, is preferably a soluble compound, but some insoluble compounds can also be used. Soluble compounds include aluminium nitrate, carbonate, halides and borate. Insoluble aluminium carbide can also be used.

EXAMPLE 4

A cylindrical piece of 25 mm diameter and 40 mm height was prepared using the micropyretic technique of Example 2, with the composition Ni:Al 86.6:13.4, mixed with colloidal cerium acetate stabilized with at least one compound of lithium, aluminium, cerium, calcium, sodium and/or potassium, preferably a soluble compound, in an amount of 24 ml/100 grams of the powder mixture. The material was then submitted to a heat treatment in air at 1000° C. for 10 hours. The weight uptake due to oxidation was about 6%. The oxidized material was impregnated by dipping into a colloidal solution of the stabilized cerium acetate for 10 minutes and drying at 250° C. This operation was repeated twice. The sample was then tested as an anode in a small electrolytic cell containing molten cryolite at 1000° C. with 5% alumina and 1.5% cerium fluoride, at a current density of 0.3 A/cm$^2$ for 4 hours. The cell voltage remained stable at 4 V during the test. The test anode was then cross-sectioned and no significant corrosion was observed.

EXAMPLE 5

The same impregnation and test procedures were applied to a second sample with the composition Ni:Al 90:10 mixed with stabilized colloidal cerium acetate in an amount of 24 ml/100 grams of the powder mixture. The test results were similar to the previous material.

EXAMPLE 6

The same impregnation and test procedures were applied to a third sample with the composition Ni:Al 90:10 but mixed with stabilized colloidal cerium acetate in an amount of 36 ml/100 grams of the powder mixture. The weight uptake after the heat treatment was more important (about 20% greater), but the material did not show any crack or fissure. The electrolytic test gave results similar to the previous examples with a somewhat higher cell voltage of 5 Volts.

EXAMPLE 7

The previous examples were repeated varying the size of the particulate nickel (1 to 10 micrometer diameter), copper (1 to 100 micrometer diameter) and aluminium (1 to 100 micrometer diameter). Best results in terms of lowest porosity and electrochemical performance were obtained with nickel 3 micrometer diameter, copper 10 micrometer diameter and aluminium 44 micrometer diameter (−325 mesh).

EXAMPLE 8

The previous examples were repeated, replacing the stabilized colloidal cerium acetate used for the material preparation and the impregnation treatment with stabilized colloidal ceria optionally containing some ceria powder. Excellent results were obtained. After a six hour test under the same conditions as in Example 4, at an anode current density of 0.3 A/cm$^2$, the colloid-impregnated nickel aluminide anodes showed little or no cryolite penetration. For comparable non-impregnated nickel aluminide anodes, fluorination of the anode composition was observed after the same six hour test.

EXAMPLE 9

Plates of TiB$_2$/alumina composite materials were prepared by mixing together particulate reactants in the molar ratio 3TiO$_2$+3B$_2$O$_3$+10Al together with a selected amount of particulate preformed TiB$_2$. The TiO$_2$ was 99% pure with a particle size of 1.5 to 2.0 micrometer. The B$_2$O$_3$ was obtained from Messrs Fischer, Catalog Number A76-3. The aluminium was −100 mesh or −325 mesh 99.5% pure, from Johnson Matthey. The TiB$_2$ was from Johnson Matthey, Catalog Number 11364.

The powders were mixed and blended for 15 to 30 minutes. Preferably, the reaction powders and TiB$_2$ are mixed in a weight ratio of about 50:50, but this ratio can range from 90:10 to 30:70, usually in the range 40:60 to 60:40. The mixed powders are then vibration poured into a die, without Segregation during pouring.

The die is pressed at about 5 K/cm$^2$ for 5 minutes and afterwards combusted, for example with a torch in a CO$_2$ atmosphere, or in a furnace under controlled atmosphere. After firing, the surface is examined for color and for any melting of the refractory. Any skin formed by melting is removed by machining to reveal the open porosity in the surface.

Specimen plates of the microporous TiB$_2$/alumina material are then impregnated with colloidal cerium acetate or colloidal alumina stabilized with sodium or other ions, as described in Examples 3 to 6 and 8.

Next, the colloid-impregnated plates are aluminized, on their face which is to be in contact with molten aluminium and which is not to be bonded, by contact of this face with molten aluminium in the presence of a cryolite-alumina flux. The aluminized surfaces are shiny and well wettable by molten aluminium.

Such planes can be bonded by their non-aluminized face to a carbon block forming the cathode of an aluminium production cell preferably by the application and drying of a slurry of TiB$_2$ in colloidal alumina, as described in U.S. Pat. No. 5,320,717 (MOL0516), the contents whereof are incorporated herein by way of reference. The colloid-impregnated tiles adhere as well as non-colloid impregnated tiles, but their longevity is expected to be much greater.

EXAMPLE 10

Specimens of prebaked anode carbon blocks made of a mixture of petroleum coke and pitch, having an average porosity of about 25%, when impregnated by colloidal alumina stabilized by sodium or other ions by the methods described in Examples 3 to 6 demonstrate improved resistance to wear by oxidation on their side surfaces and are less subject to attack leading to unwanted disintegration at the anode/electrolyte interface.

EXAMPLE 11

The above examples can be repeated including in the liquid carrier of the colloid at least one of the aforementioned lithium compounds together with at least one of the aforementioned aluminium compounds. These compounds react together and, when the component is made of carbon, with the carbon to form aluminium oxycarbide and/or aluminium carbide Al$_4$C which act as an oxidation-resistant and electrically-conductive binder for the carbon and contribute to the great oxidation resistance of the material and make it wettable by molten cryolite. Altogether, the addition of these lithium and aluminium compounds greatly increases the stability of the material in the environment of an aluminium production cell.

For instance, a solution can be prepared by thoroughly mixing 5 g of AlNO$_3$.9H$_2$O (98%) and 5 g of LiNO$_3$ (99%) in 50 ml of water, and this carrier solution then mixed with colloidal alumina to provide a solid alumina colloid content of about 10 to 20 weight % of the total. Anode grades of carbon impregnated with this reagent-containing colloidal alumina followed by heat treatment at about 1000° C. show improved stability and resistance to penetration by unwanted ions. Cathode grades of carbon impregnated with this reagent-containing colloidal alumina followed by heat treatment at about 1000° C. show improved stability and greater resistance to penetration by sodium.

EXAMPLE 12

Samples of cathode-grade carbon were impregnated with colloidal alumina by dipping them in Nyacol™ colloidal alumina containing 20 wt % alumina stabilized with ionic species of at least one of lithium, aluminium, cerium, calcium, sodium, potassium and ammonium, for 5 minutes, removing them and air drying in an oven for 1 hour at 200° C. This produced a weight uptake of approximately 1.7%. The dipping process was repeated, but there was no further weight uptake, indicating that the sample was saturated with alumina.

These impregnated samples and corresponding non-impregnated samples were then subjected to a sodium penetration test. This test consisted of cathodically polarizing the samples in an approximately 33/67 wt % sodium fluoride/sodium chloride electrolyte at about 710° C. and at a current density of 0.15 A/cm$^2$ or 0.1 A/cm$^2$ for variable test periods, usually between 5 and 10 hours. These test conditions simulate the effects of sodium penetration in commercial working conditions over much longer periods.

The impregnated samples showed a higher resistance to sodium penetration than the non-impregnated samples which showed signs of substantial degradation after only about 3 hours.

Several of the impregnated samples were sectioned and submitted to analyses to determine the extent of alumina penetration. Alumina was detected uniformly through the sample to a depth of 10 mm, corresponding to the center of the sample. The samples had a random distribution of narrow pores from the sample surface to a depth of 1 mm. Impregnation to the center of the sample took place through an interconnected inner pore system, in the carbon.

EXAMPLE 13

Several of the colloid-impregnated samples of Example 12 were further coated with a TiB$_3$ coating as follows.

A Slurry was prepared from a dispersion of 10 g TiB$_2$, 99.5% pure, −325 mesh (<42 micrometer), in 25 ml of colloidal alumina containing about 20 weight % of solid alumina. Coatings with a thickness of 150±50 to 500±50 micrometer were applied to the faces of carbon blocks. Each layer of slurry was allowed to dry for several minutes before applying the next, followed by a final drying by baking in an oven at 100°–150° C. for 30 minutes to 1 hour.

The above procedure was repeated varying the amount of TiB$_2$ in the slurry from 5 to 15 g and varying the amount of colloidal alumina from 10 ml to 40 ml. Coatings were applied as before. Drying in air took 10 to 60 minutes depending on the dilution of the slurry and the thickness of the coatings. In all cases, an adherent layer of TiB$_2$ was obtained.

The TiB$_2$-coated samples impregnated with stabilized colloid showed an even higher resistance to sodium penetration than the colloid-impregnated uncoated samples, when submitted to the same sodium penetration test. These coated samples additionally exhibited improved wettability by molten aluminium. Compared to non-impregnated samples coated in the same way, the impregnated and coated samples showed a better resistance to sodium penetration.

I claim:

1. A method of conditioning a component of an electrolytic cell to produce aluminium, by electrolyzing alumina in a molten fluoride electrolyte, which cell component is made of a microporous material which remains stable or may be consumed in the cell, said microporous material having an open porosity which extends to at least one surface of the component which, in use, is exposed to conditions in the cell, wherein the method comprises impregnating the component with a colloid selected from the group consisting of colloidal ceria, cerium acetate, silica, alumina, lithia, yttria, thoria, zirconia, magnesia and monoaluminium phosphate and mixtures thereof stabilized with ionic species of at least one of sodium, lithium, potassium, aluminium, calcium and ammonium, and drying the colloid-impregnated component, said colloid not containing refractory hard materials.

2. The method of claim 1, wherein impregnation of the component is followed by a heat treatment.

3. The method of claim 2, wherein impregnation of the component is preceded by a heat treatment.

4. The method of claim 1, wherein the impregnation and the drying steps are repeated until the component is saturated with the colloid.

5. The method of claim 1, wherein the component is impregnated by dipping it into the colloid.

6. The method of claim 1, wherein impregnation is assisted by the application of pressure or a vacuum.

7. The method of claim 1, wherein the component is impregnated with a cerium-based colloid.

8. The method of claim 7, wherein the cerium-based colloid comprises at least one of colloidal ceria and colloidal cerium acetate.

9. The method of claim 8,-wherein the cerium-based colloidal carrier further comprises at least one of colloidal alumina, lithia, yttria, silica, thoria, zirconia, magnesia or monoaluminium phosphate.

10. The method of claim 1, wherein the liquid carrier contains at least one compound of lithium and at least one compound of aluminium.

11. The method of claim 1, wherein the colloid is derived from colloid precursors and reagents which are solutions of at least one salt selected from chlorides, sulfates, nitrates, chlorates, perchlorates or metal organic compounds selected from alkoxides, formates, acetates and mixtures thereof.

12. The method of claim 11, wherein the solutions of metal organic compounds, principally metal alkoxides, are of the general formula M(OR)$_z$ where M is a metal or complex cation, R is an alkyl chain and z is a number from 1 to 12.

13. The method of claim 1, wherein the colloid has a dry colloid content corresponding to up to 50 weight % of the colloid plus liquid carrier.

14. The method of claim 13 wherein the colloid has a dry colloid content from 10 to 20 weight % of the colloid plus liquid carrier.

15. The method of claim 1, wherein the microporous material has an open porosity from 5% to 40%.

16. The method of claim 1, wherein impregnation of the component is followed by the application of a protective coating.

17. The method of claim 16, wherein the component is an anode and the protective coating comprises at least one rare earth oxycompound including cerium oxyfluoride.

18. The method of claim 16, wherein the anode is impregnated with a cerium-based colloid before application of the cerium oxyfluoride.

19. The method of claim 16, wherein the component is a cathode and the protective coating comprises a Refractory Hard Metal boride.

20. The method of claim 1, wherein the component is a prebaked carbon anode which is impregnated with colloidal alumina.

21. The method of claim 1, wherein the impregnated component is a cell bottom or lining.

22. A component of an electrolytic cell to produce aluminium, by electrolyzing alumina in a molten fluoride electrolyte, which cell component is made of a microporous material which remains stable or may be consumed in the cell, said microporous material having an open porosity which extends to at least one surface of the component which, in use, is exposed to conditions in the cell, wherein the component is impregnated with a dried colloid selected from the group consisting of dried colloidal ceria, cerium acetate, silica, alumina, lithia, yttria, thoria, zirconia, magnesia or monoaluminium phosphate and mixtures thereof stabilized with species of at least one of sodium, lithium, potassium, aluminium, calcium and ammonium, said colloid not containing refractory hard materials.

23. The component of claim 22, wherein the pores of the microporous material are saturated with the dried colloid.

24. The component of claim 22, which is impregnated with a cerium-based colloid.

25. The component of claim 24, wherein the cerium-based colloidal carrier further comprises at least one of colloidal alumina, lithia, yttria, silica, thoria, zirconia, magnesia or monoaluminium phosphate.

26. The component of claim 22, wherein the cerium-based colloid comprises at least one of colloidal ceria and colloidal cerium acetate.

27. The component of claim 22, wherein the colloid is dried from a liquid carrier which contains at least one compound of lithium and at least one compound of aluminium.

28. The component of claim 22, wherein the colloid is derived from colloid precursors and reagents which are solutions of at least one salt selected from chlorides, sulfates, nitrates, chlorates, perchlorates or metal organic compounds selected from alkoxides, formates, acetates and mixtures thereof.

29. The component of claim 28, wherein the solutions of metal organic compounds, principally metal alkoxides, are of the general formula $M(OR)_z$ where M is a metal or complex cation, R is an alkyl chain and z is a number usually from 1 to 12.

30. The component of claim 22, wherein the microporous material has an open porosity from 5% to 40%.

31. The component of claim 22, wherein the colloid-impregnated microporous material is coated with a protective coating.

32. The component of claim 31, which is an anode and the protective coating comprises at least one rare earth oxycompound including cerium oxyfluoride.

33. The component of claim 32, wherein the anode is impregnated with a cerium-based colloid before application of the cerium oxyfluoride coating.

34. The component of claim 31, which is a cathode and the protective coating comprises a Refractory Hard Metal boride.

35. The component of claim 31, which is a prebaked carbon anode impregnated with colloidal alumina.

36. The component of claim 22, which is a colloid-impregnated cell bottom or lining.

37. The component of claim 22, wherein the microporous material comprises an ordered aluminide of at least one of nickel, copper and titanium.

38. The component of claim 22, wherein the microporous material is carbon.

39. The component of claim 22, wherein the microporous material is a carbon-based composite material comprising carbon and at least one further component selected from refractory oxycompounds, and refractory hard metal borides, carbides and silicides.

40. The component of claim 39 wherein said refractory compound is alumina and wherein said refractory hard metal boride is titanium diboride.

41. The component of claim 22, wherein the microporous material is a composite material of a refractory hard metal boride and a refractory oxide, selected from titanium diboride/alumina.

42. The component of claim 41 wherein said refractory hard metal boride is titanium diboride and wherein said refractory oxide is alumina.

43. An electrolytic cell to produce aluminium, by electrolyzing alumina in a molten fluoride electrolyte, comprising a component made of a microporous material which remains stable or may be consumed in the cell and which has open porosity extending to its surface exposed to conditions in the cell, wherein the component is impregnated with a dried colloid selected from the group consisting of dried colloidal ceria, cerium acetate, silica, alumina, lithia, yttria, thoria, zirconia, magnesia or monoaluminium phosphate and mixtures thereof, stabilized with species of at least one of sodium, lithium, potassium, aluminium, calcium and ammonium, said colloid not containing refractory hard materials.

44. The cell of claim 43, wherein the component is an anode and the protective coating comprises at least one rare earth oxycompound including cerium oxyfluoride.

45. The cell of claim 43, wherein the anode is impregnated with a cerium-based colloid before application of the cerium oxyfluoride coating.

46. The cell of claim 43, wherein the component is a cathode and the protective coating comprises a Refractory Hard Metal boride.

47. The cell of claim 43, wherein the component is a prebaked carbon anode which is impregnated with colloidal alumina.

48. The cell of claim 43, wherein the impregnated component is a cell bottom or lining.

49. A method of conditioning a carbon or carbon-based component of an electrolytic cell to produce aluminium, by electrolyzing of alumina in a sodium-containing molten halide electrolyte of cryolite environment, to improve resistance of the carbon to damage by penetration therein of sodium or other components of the cell environment, wherein the method comprises impregnating, coating or impregnating and coating a surface of the component subject to contact with the cell environment with a colloid selected from the group consisting of colloidal alumina, ceria, cerium acetate, silica, lithia, yttria, thoria, zirconia, magnesia, monoaluminium phosphate, and mixtures thereof, containing ionic species of at least one of sodium, lithium, potassium, aluminium, calcium and ammonium, and drying the colloid-impregnated component to provide a dried colloid stabilized by said sodium, lithium, potassium, aluminium, calcium and ammonium, said colloid not containing refractory hard materials.

50. The method of claim 49 further comprising the step of including in said surface of the component, a refractory material, wherein the carbon or carbon-based material of the component is present under the refractory material and is impregnated with said stabilized colloid.

51. A carbon or carbon-based cathodic component of an electrolytic cell to production aluminium, by electrolyzing alumina in a sodium-containing molten halide electrolyte of cryolite environment, wherein at least one surface of the component which, in use, is exposed to conditions in the cell is impregnated coated or impregnated and coated with a dried colloid selected from the group consisting of dried colloidal alumina, ceria, cerium acetate, silica, lithia, yttria, thoria, zirconia, magnesia, monoaluminium phosphate and mixtures thereof, stabilized with species of at least one of sodium, lithium, potassium, aluminium, calcium and ammonium, said colloid not containing refractory hard materials.

52. The component of claim 51 further comprising a refractory material coating wherein the carbon or carbon-based material of the component is present under said refractory material, said carbon or carbon-based material being impregnated with the stabilized colloid.

* * * * *

UNITED STATES PATENT AND TRADEMARK OFFICE
CERTIFICATE OF CORRECTION

PATENT NO. : 5,578,174
DATED : Nov. 26, 1996
INVENTOR(S) : Sekhar

It is certified that error appears in the above-indentified patent and that said Letters Patent is hereby corrected as shown below:

Title page, item [73] Assignee:, please change "Luxembourg, Luxembourg" to --Luxembourg--.

Column 14, line 55
In claim 49, line 55, please change "aluminium, by" to -- aluminum by --.

Column 14, line 56
In claim 49, line 56, please change "of alumina" to --alumina--.

Column 15, line 11
In claim 51, line 11, please change "production aluminium," to --produce aluminum--.

Signed and Sealed this

Eighteenth Day of February, 1997

Attest:

BRUCE LEHMAN

*Attesting Officer*   *Commissioner of Patents and Trademarks*